(12) United States Patent
Lai

(10) Patent No.: US 8,406,196 B2
(45) Date of Patent: Mar. 26, 2013

(54) WIRELESS NETWORK SYSTEM AND WIRELESS ACCESS POINT DEVICE THEREOF

(75) Inventor: Chung-Chiu Lai, Hsinchu County (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 318 days.

(21) Appl. No.: 12/871,915

(22) Filed: Aug. 31, 2010

(65) Prior Publication Data

US 2012/0020215 A1 Jan. 26, 2012

(30) Foreign Application Priority Data

Jul. 20, 2010 (TW) ................................ 99123840 A

(51) Int. Cl.
*H04W 4/00* (2009.01)
*H04L 1/00* (2006.01)
*H04W 36/00* (2009.01)
(52) U.S. Cl. ...................... 370/331; 370/235; 455/436
(58) Field of Classification Search ................. None
See application file for complete search history.

(56) References Cited

U.S. PATENT DOCUMENTS

| 7,480,264 B1 | 1/2009 | Duo et al. | |
| 7,675,890 B2 | 3/2010 | Wang | |
| 2004/0068668 A1* | 4/2004 | Lor et al. | 713/201 |
| 2007/0019598 A1* | 1/2007 | Prehofer | 370/338 |
| 2007/0274211 A1* | 11/2007 | Tsubota | 370/229 |
| 2008/0085723 A1* | 4/2008 | Tsao et al. | 455/452.2 |
| 2008/0228942 A1* | 9/2008 | Lor et al. | 709/238 |
| 2009/0191858 A1* | 7/2009 | Calisti et al. | 455/422.1 |
| 2009/0290489 A1 | 11/2009 | Wang et al. | |
| 2010/0240373 A1* | 9/2010 | Ji et al. | 455/436 |
| 2010/0275244 A1* | 10/2010 | Lor et al. | 726/3 |
| 2011/0039564 A1* | 2/2011 | Johnstone et al. | 455/436 |
| 2012/0201201 A1* | 8/2012 | Liu et al. | 370/328 |

FOREIGN PATENT DOCUMENTS

| TW | 595159 | 6/2004 |
| TW | I271976 | 1/2007 |
| TW | 200952370 | 12/2009 |
| TW | I318542 | 12/2009 |

\* cited by examiner

*Primary Examiner* — Clemence Han
(74) *Attorney, Agent, or Firm* — Jianq Chyun IP Office

(57) ABSTRACT

A wireless network system and a wireless access point (AP) device thereof are provided. The wireless network system includes at least a wireless AP device and a plurality of wireless terminal devices. Each wireless AP device maintains a load list including load states of all wireless AP devices in the same area, and ranks load states of all wireless AP devices in the load list at least according to central processing unit utilization rates of the wireless AP devices. When a wireless terminal device transmits a connection request to one wireless AP device, the wireless AP determines whether it being in a low load state, and decides, depending upon whether it being in the low load state, to accept the connection request or to notify one or a plurality of wireless AP devices being in the low load states in the same area to accept the connection request.

20 Claims, 5 Drawing Sheets

WIRELESS NETWORK SYSTEM AND WIRELESS ACCESS POINT DEVICE THEREOF

CROSS-REFERENCE TO RELATED APPLICATION

This application claims the priority benefit of Taiwan application serial no. 99123840, filed on Jul. 20, 2010. The entirety of the above-mentioned patent application is hereby incorporated by reference herein and made a part of specification.

BACKGROUND

1. Field of the Invention

The invention relates to a load balancing mechanism of a wireless access point (AP) device. More particularly, the invention relates to a wireless network system having a load balancing mechanism and a wireless AP device thereof.

2. Description of Related Art

Presently, wireless networks are widely used in various circumstances and occasions. Multiple users can use wireless terminal devices to connect a wireless AP device for accessing the wireless network. In a conventional wireless network (for example, a wireless network using an IEEE 802.11a/b/g/n standard), the wireless terminal device generally determines the wireless AP device to be connected according to signal strengths of radio frequency (RF) signals transmitted by the wireless AP devices. Assuming two neighbouring wireless AP devices A and B are simultaneously located in a same area, if relatively more wireless terminal devices are located close to the wireless AP device A, since the conventional connection method is to select the wireless AP device according to RF signal signal strengths transmitted by the wireless AP devices, there would be relatively more wireless terminal devices being connected to the wireless AP device A, so that the wireless AP device may be in an overload state.

If there are too many wireless terminal devices simultaneously being connected to a single wireless AP device, these wireless terminal devices may have poor network connections, and users operating the wireless terminal devices may feel a slow or an unstable network connection. Therefore, it is an important issue to resolve an unbalanced load problem of the current wireless network.

SUMMARY

Accordingly, the invention is directed to a wireless network system and a wireless access point (AP) device thereof, by which a load balancing mechanism in the wireless network system is achieved through a distributed structure.

According to one aspect, a wireless network system provided by the invention has a load balancing mechanism, and a wireless AP device in the wireless network system aperiodically obtains current load states of other wireless AP devices in the same area, and maintains a load list of the load states of all wireless AP devices. Therefore, according to its own load state, the wireless AP device determines whether or not to accept a connection request message of a wireless terminal device, or notifies one or a plurality of other wireless AP devices being in low load states in the same area to accept the connection request message.

According to another aspect, the wireless AP device can also determine whether or not to activate the load balancing mechanism according to its own load state. The wireless AP devices which have activated load balancing mechanism can collaboratively determine whether or not to further accept a connection request message of a wireless terminal device, and further determine one or a plurality of wireless AP devices being in low load states in the same area to accept the connection request message, so as to achieve load balance of the wireless network system.

According to an exemplary embodiment of the invention, the invention provides a wireless network system including at least a wireless AP device and a plurality of wireless terminal devices. Each one of the wireless AP devices maintains a load list of load states of all wireless AP devices in a same area, and ranks the load states of all wireless AP devices in the load list according to at least current central processing unit (CPU) utilization rates of the wireless AP devices. Moreover, when a wireless terminal device sends a connection request message to the wireless AP device, the wireless AP device determines whether itself being in a low load state, and selects to accept the connection request message or notifies one or a plurality of wireless AP devices being in the low load states in the same area to accept the connection request message according to the fact whether the wireless AP device itself being in the low load state.

According to an exemplary embodiment of the invention, the invention provides a wireless AP device adapted for providing a wireless network connection service to at least one wireless terminal device and executing a load balancing mechanism. The wireless AP device includes a wireless transceiver module, a memory module and a processor module. The wireless transceiver module is configured for wirelessly connecting with at least one wireless AP device in a same area or at least one wireless terminal device. The memory module includes a wireless communication protocol processing module and a load management module. The wireless communication protocol processing module is configured for processing a connection request message sent by at least one wireless terminal device. The load management module maintains a load list of load states of all wireless AP devices in the same area, and ranks the load states of all wireless AP devices in the load list according to at least current central processing unit (CPU) utilization rates of the wireless AP devices. The processor module is configured for executing the wireless communication protocol processing module and the load management module, and controlling the wireless transceiver module and the memory module. Moreover, when the wireless terminal device sends a connection request message to the wireless AP device, the load management module selects to accept the connection request message or notifies one or a plurality of wireless AP devices being in the low load states in the same area to accept the connection request message according to the CPU utilization rate of the processor module.

According to an exemplary embodiment of the invention, the invention provides a wireless AP device adapted for providing a wireless network connection service to at least one wireless terminal device and executing a load balancing mechanism. The wireless AP device includes a wireless transceiver module, a memory module and a processor module. The wireless transceiver module is configured for wirelessly connecting with at least one wireless AP device in a same area or at least one wireless terminal device. The memory module includes a wireless communication protocol processing module and a load management module. The wireless communication protocol processing module is configured for processing a connection request message sent by at least one wireless terminal device. The load management module maintains a load list of load states of all wireless AP devices in the same area, and broadcasts an update notification to the other wireless AP devices in the same area when the load state of the wireless AP device is changed, so that the other wireless AP devices update their own load lists respectively. The processor module is configured for executing the wireless communication protocol processing module and the load management module, and controlling the wireless transceiver module and the memory module. Moreover, when a wireless terminal device sends a connection request message to the wireless AP device, the load management module determines whether the wireless AP device is in a low load state, and selects to accept the connection request message or notify one or a plurality of wireless AP devices being in the low load states to accept the connection request message according to the fact whether the wireless AP device itself being in the low load state.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
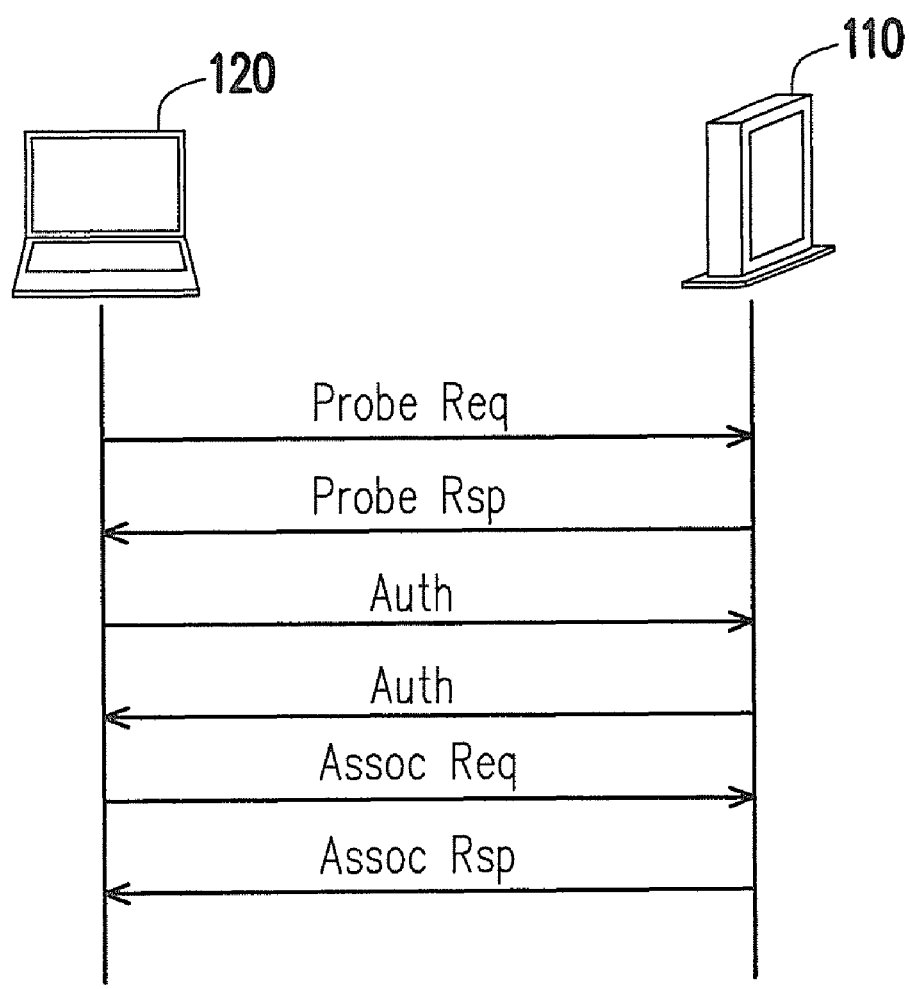
FIG. 1 is a schematic flowchart illustrating a process of establishing a connection between a wireless access point (AP) device and a wireless terminal device according to an exemplary embodiment of the invention.

FIG. 1 is a schematic flowchart illustrating a process of establishing a connection between a wireless access point (AP) device and a wireless terminal device according to an exemplary embodiment of the invention. Referring to FIG. 1, the wireless AP device 110 receives a connection request message from a wireless terminal device 120 (for example, a mobile phone, a notebook or a flat panel computer). The connection request message is, for example, a probe request (or Probe Req), an authentication, or an association request (or Assoc Req). The wireless AP device 110 replies a response message in response to the connection request message, for example, a probe response (or Probe Rsp), an authentication or an association response (or Assoc Rsp). Generally, after the connection is established, data can be transmitted between the wireless AP device 110 and the wireless terminal device 120. In the present embodiment of the invention, a control method of the wireless AP device is further added in the above connection establishment mechanism, so as to achieve a distributed load balancing mechanism in a wireless network system.

Figure 2:
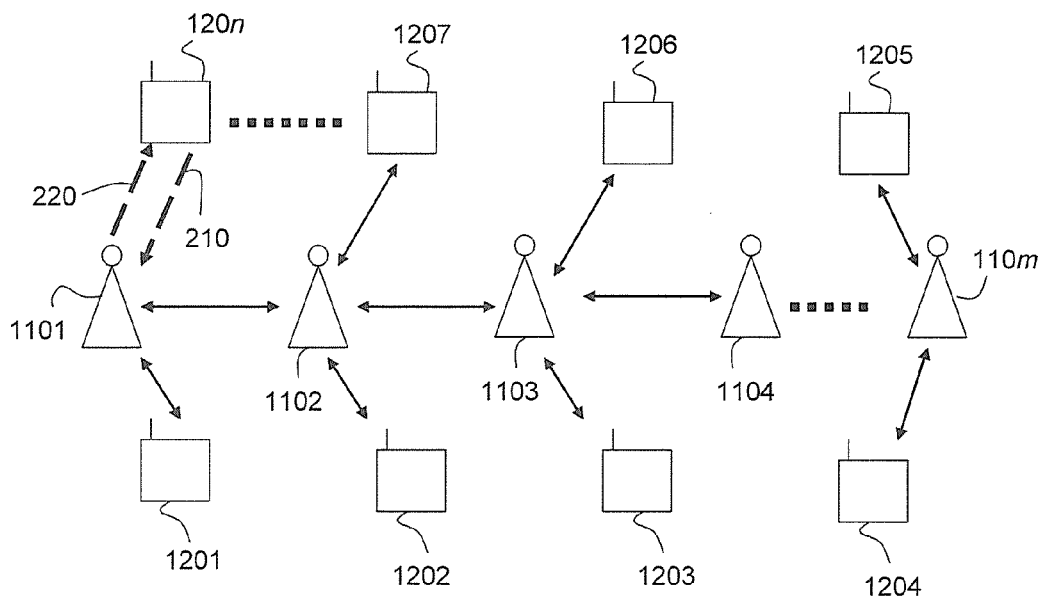
FIG. 2 is a schematic diagram illustrating a wireless network system according to an exemplary embodiment of the invention.

FIG. 2 is a schematic diagram illustrating a wireless network system 20 according to an exemplary embodiment of the invention. The wireless network system 20 includes a plurality of wireless AP devices 1101, 1102, 1103, 1104, ... , 110$m$ distributed within a same area, where m is a positive integer. Moreover, the wireless network system 20 further includes a plurality of wireless terminal devices 1201, 1202, 1203, 1204, 1205, 1206, 1207, . . . , 120$n$ distributed in a neighbouring area of the wireless AP devices 1101, 1102, 1103, 1104, . . . , 110$m$, where n is a positive integer. The wireless terminal device is, for example, a desktop computer, a notebook computer, a smart phone, a personal digital assistant (PDA), a television, a multimedia player or a mobile communication device. The wireless terminal devices 1201-1207, . . . , 120$n$ may respectively send a connection request message to one of the wireless AP devices 1101-1104, . . . , 110$m$, and after the connection establishment mechanism of FIG. 1 is completed, data transmission is performed between the wireless terminal device and the connected wireless AP device.

Referring to FIG. 2, each one of the wireless AP devices (for example, the wireless AP devices 1101-1104, . . . , 110$m$) in the wireless network system 20 maintains a load list of load states of all wireless AP devices in the same area, and ranks the load states of all wireless AP devices in the load list according to at least current central processing unit (CPU) utilization rates of the wireless AP devices. For example, the wireless AP device 1101 collects information regarding the load states of the wireless AP devices 1102-1104, . . . , 110$m$, and ranks the load states (including the load state of the wireless AP device 1101 itself) of all wireless AP devices in a load list.

In the present exemplary embodiment, the wireless AP devices 1101-1104, . . . , 110$m$ respectively use an Inter Access Point Protocol (IAPP) to communicate with each other about their load states, where the load state includes a CPU utilization rate, a bandwidth availability and a total number of connected wireless terminal devices. However, the invention is not limited to the IAPP, and the wireless AP devices can update the load states by using other communication protocols.

In the present exemplary embodiment, each one of the wireless AP devices broadcasts an update notification to other wireless AP devices in the same area when the load state thereof is changed, so that the other wireless AP devices may respectively update their own load lists. For example, assuming the wireless AP device 1101 is originally connected to the wireless terminal device 1201, and now a total number of the connected wireless terminal device is 1, and the CPU utilization rate is 5%. When an unconnected wireless terminal device 120$n$ sends a connection request message 210 to the wireless AP device 1101, and receives a response message 220 (roughly including the aforementioned probe response, the authentication and the association response) from the wireless AP device 1101, according to the connection establishment mechanism of FIG. 1, the total number of the connected wireless terminal devices of the wireless AP device 1101 is increased to 2, and the CPU utilization rate is correspondingly increased to 8%. Now, the wireless AP device 1101 notifies the updated total number of the connected wireless terminal devices and the updated CPU utilization rate to the other wireless AP devices (for example, the wireless AP devices 1102-1104, . . . , 110$m$) in the same area.

Each one of the wireless AP devices respectively ranks the load state of every wireless AP device to be in a high load state, a medium load state and a low load state in the load list according to the current CPU utilization rates, the current bandwidth availability and the current total numbers of connected wireless terminal devices of all of the wireless AP devices. The bandwidth availability is, for example, 11 Mbps of IEEE 802.11b standard, 54 Mbps of IEEE 802.11g standard and 450 Mbps of IEEE 802.11n standard.

In an exemplary embodiment of the invention, the low load state (or a condition of classifying a wireless AP device into a low load group) is that a total number of the connected wireless terminal device of a wireless AP device is smaller than or equal to a predetermined connection number threshold M, the CPU utilization rate is less than or equal to a first CPU utilization rate threshold (for example, 30%), and the bandwidth availability is less than or equal to a first bandwidth availability threshold (for example, 30%), where the predetermined connection number threshold M is a positive integer. Moreover, the medium load state (or a condition of classifying a wireless AP device into a medium load group) is that a total number of the connected wireless terminal device of a wireless AP device is less than or equal to the predetermined connection number threshold M, the CPU utilization rate is less than or equal to a second CPU utilization rate threshold (for example, 60%), and the bandwidth availability is less than or equal to a second bandwidth availability threshold (for example, 60%). In addition, the high load state (or a condition of classifying a wireless AP device into a high load group) is that a total number of the connected wireless terminal device of a wireless AP device is greater than the predetermined connection number threshold M, or the CPU utilization rate is greater than the second CPU utilization rate threshold, or the bandwidth utilization rate is greater than the second bandwidth utilization rate threshold.

In an exemplary embodiment of the invention, when the wireless terminal device 120n sends a connection request message to the wireless AP device 1101, the wireless AP device 1101 determines whether itself being in the low load state, and selects to accept the connection request message, or notifies one or a plurality of other wireless AP devices (for example, the wireless AP devices 1102 and 1103) being in the low load states in the same area to accept the connection request message according to the fact whether itself being in the low load state. For example, when the wireless AP device 1101 receives the connection request message from the wireless terminal device 120n, and the wireless AP device 1101 determines itself being in the low load state, the wireless AP device 1101 can automatically accept the connection request message. On the contrary, when the wireless AP device 1101 receives the connection request message from the wireless terminal device 120n, and the wireless AP device 1101 determines itself is not in the low load state, the wireless AP device 1101 rejects the connection request message, and notifies one or a plurality of other wireless AP devices (for example, the wireless AP devices 1102 and 1103) which are in the low load states in the same area to accept the connection request message.

In the wireless network system 20, each one of the wireless AP devices further determines whether or not to activate its own load balancing mechanism according to the total number of the connected wireless terminal devices, the CPU utilization rate and the bandwidth availability. If a total number of the connected wireless terminal devices of a wireless AP device is greater than the predetermined connection number threshold M, such wireless AP device activates the load balancing mechanism. If a CPU utilization rate of a wireless AP device is greater than the first CPU utilization rate threshold, such wireless AP device activates the load balancing mechanism. If a bandwidth availability of a wireless AP device is greater than the first bandwidth availability threshold, such wireless AP device activates the load balancing mechanism.

In an exemplary embodiment, assuming the wireless AP device 1101 has activated the load balancing mechanism, when the wireless terminal device 120n sends a connection request message to the wireless AP device 1101, the wireless AP device 1101 does not reply the connection request message (including the probe request, the authentication, or the association request) of the wireless terminal device 120n, or transmits back a disassociation message to the wireless terminal device 120n, where a reason code of the disassociation message is 5, which represents that the wireless AP device 1101 disassociates from the wireless terminal device 120n due to that the wireless AP device 1101 cannot simultaneously process all of the associated wireless terminal devices.

In the wireless network system 20, the wireless AP devices may select to collaboratively process a connection request message of an unconnected wireless terminal device. When all of the wireless AP devices (for example, the wireless AP devices 1101-1104, . . . , 110m) in the same area have activated the load balancing mechanism, the wireless AP devices use the IAPP to communicate with each other regarding their respective load states, and determine whether or not to accept the connection request message of an unconnected wireless terminal device. When all of the wireless AP devices have activated the load balancing mechanism, and all of the wireless AP devices collaboratively determine to accept the connection request message of the unconnected (newly added) wireless terminal device, the wireless AP devices further determine which of the wireless AP devices is capable of accepting the connection request message according to the current CPU utilization rate, the bandwidth availability and the total number of the connected wireless terminal device of each one of the wireless AP devices.

For example, the wireless AP devices 1101-1104, . . . , 110m can respectively and sequentially search through their own load lists so as to collaboratively determine a wireless AP device (for example, the wireless AP device 1103) having a relatively low CPU utilization rate, a relatively low availability and relatively less connected wireless terminal devices, and notify such wireless AP device to accept the connection request message of the unconnected wireless terminal device (for example, the wireless terminal device 120n). After the wireless network system 20 is introduced, functional block diagrams of a wireless AP device and a wireless terminal device are introduced with reference of FIG. 3A and FIG. 3B.

Figure 3A:
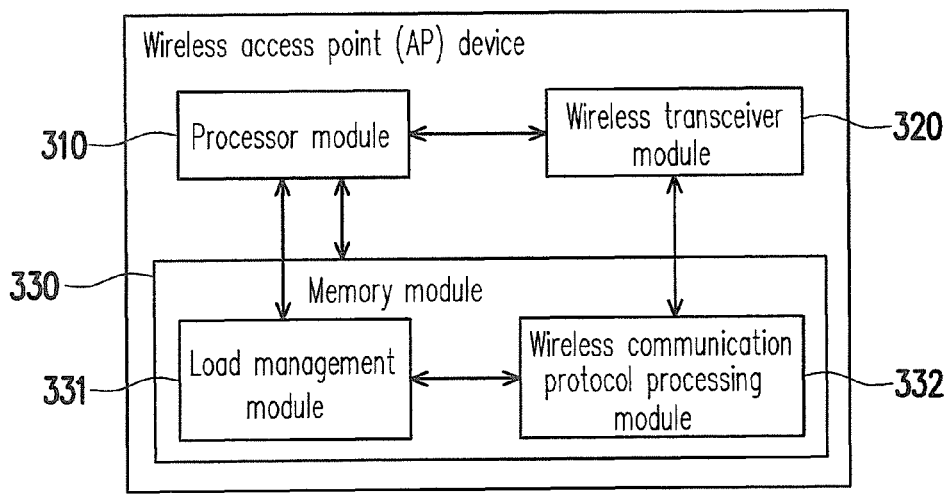
FIG. 3A is a functional block diagram illustrating a wireless AP device according to an exemplary embodiment of the invention.

FIG. 3A is a functional block diagram illustrating a wireless AP device 30 according to an exemplary embodiment of the invention. Referring to FIG. 2 and FIG. 3A, the wireless AP device 30 includes a processor module 310, a wireless transceiver module 320 and a memory module 330. The wireless transceiver module 320 is configured for wirelessly connecting with at least one wireless AP device in the same area or at least one wireless terminal device, and the wireless transceiver module 320 includes at least one antenna unit (not shown). The processor module 310 may include one or a plurality of CPUs.

Referring to FIG. 3A, the memory module 330 includes a load management module 331 and a wireless communication protocol processing module 332. The load management module 331 maintains a load list of the load states of all wireless AP devices in the same area, and ranks the load states of all wireless AP devices in the load list according to at least the current CPU utilization rates of the wireless AP devices. The wireless communication protocol processing module 332 is configured for processing a connection request message sent by at least one wireless terminal device. The memory module 330 may further include operating system software, a firmware module or other application programs, and the processor module 310 can execute these software or firmware, but these software or firmware are not main features of the invention, so that detailed descriptions thereof are omitted.

Referring to FIG. 2 and FIG. 3A, the processor module 310 is configured for executing the load management module 331 and the wireless communication protocol processing module 332, and controlling the wireless transceiver module 320 and the memory module 330. Moreover, when a wireless terminal device sends a connection request message to the wireless AP device 30, the load management module 331 selects to accept the connection request message or notifies one or a plurality of wireless AP devices being in the low load states in the same area to accept or process the connection request message according to a CPU utilization rate of the processor module 330.

In the present exemplary embodiment, the load management module 331 can further rank the load state of each wireless AP device to be in the high load state, the medium load state or the low load state in the load list according to the current CPU utilization rates, the current bandwidth availability and the current total numbers of connected wireless terminal devices of all of the wireless AP devices. Related descriptions for the method of determining the load state can be referred to FIG. 2, so the detailed descriptions are not repeated herein.

However, the invention is not limited to the above descriptions, in other exemplary embodiments, the load management module 331 and the wireless communication protocol processing module 332 can be replaced by hardware units, and the processor module 310 controls and collaborates the load management module (not shown) and the wireless communication protocol processing module (not shown).

Figure 3B:
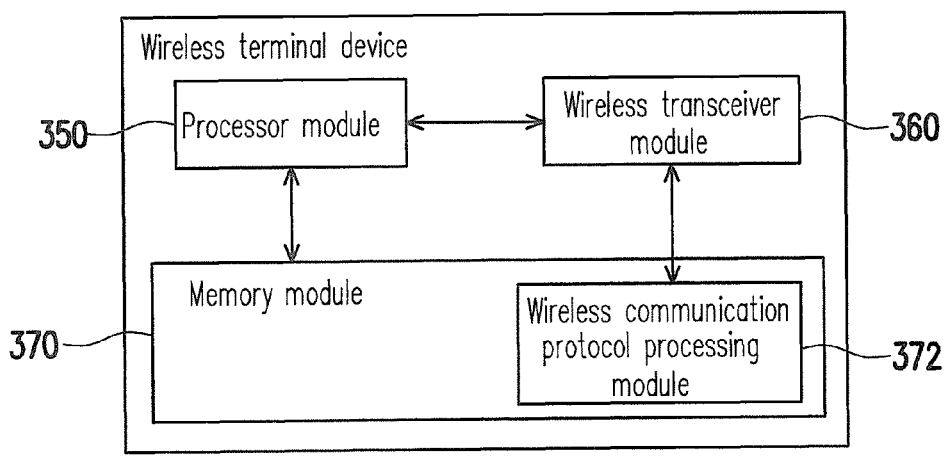
FIG. 3B is a functional block diagram illustrating a wireless terminal device according to an exemplary embodiment of the invention.

FIG. 3B is a functional block diagram illustrating a wireless terminal device 35 according to an exemplary embodiment of the invention. Referring to FIG. 2 and FIG. 3B, the wireless terminal device 35 includes a processor module 350, a wireless transceiver module 360 and a memory module 370. The wireless transceiver module 360 is configured for wirelessly connecting with at least one wireless AP device in the same area, and the wireless transceiver module 360 includes at least one antenna unit (not shown). The memory module 370 includes a wireless communication protocol processing module 372. The wireless communication protocol processing module 372 is used for sending a connection request message to at least one wireless AP device, and is configured for processing a connection establishment flow and processing a data transmission flow after the connection is established. The processor module 350 is configured for executing the wireless communication protocol processing module 372, and controlling the wireless transceiver module 360 and the memory module 370. The processor module 350 may include one or a plurality of CPUs. After detailed functional elements of the wireless AP device and the wireless terminal device are introduced, a detailed flow of a load balancing method of the wireless AP device is further introduced with reference of FIG. 4-FIG. 6.

Figure 4:
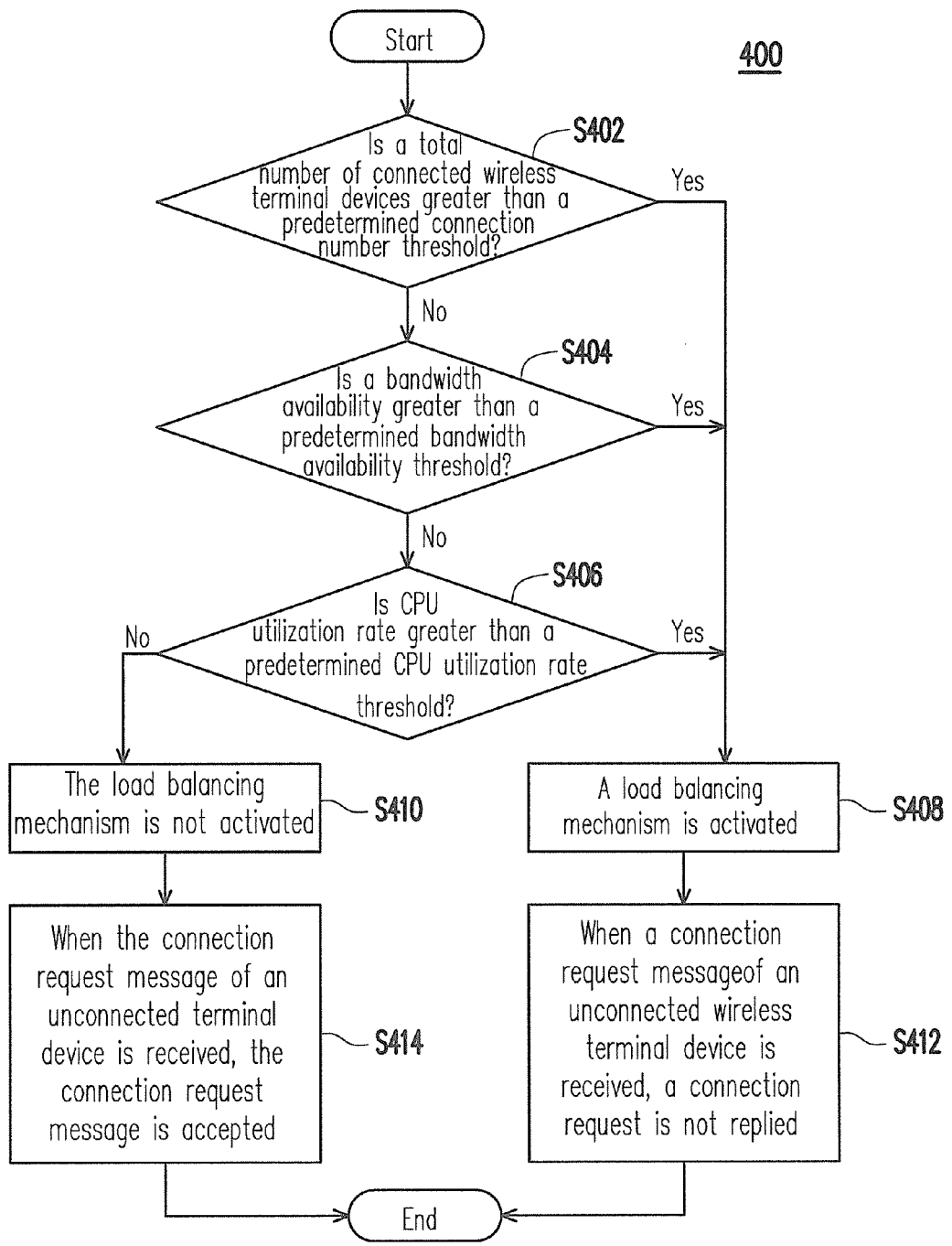
FIG. 4 is a flowchart illustrating a load balancing method of a wireless AP device according to an exemplary embodiment of the invention.

FIG. 4 is a flowchart illustrating a load balancing method 400 of a wireless AP device according to an exemplary embodiment of the invention. Referring to FIG. 3A and FIG. 4, the load balancing method 400 starts at a step S402, and in steps S402-S406, it is determined whether a condition of activating the load balancing mechanism is satisfied. In the step S402, the load management module 331 of a wireless AP device determines whether the total number of the connected wireless terminal devices is greater than the predetermined connection number threshold. If the total number of the connected wireless terminal devices is less than the predetermined connection number threshold, after the step S402, the step S404 is executed; and if the total number of the connected wireless terminal devices is greater than the predetermined connection number threshold, after the step S402, a step S408 is executed.

In the step S404, the load management module 331 of the wireless AP device determines whether the bandwidth availability is greater than the predetermined bandwidth availability threshold. If the bandwidth availability is less than the predetermined bandwidth availability threshold, after the step S404, the step S406 is executed; and if the bandwidth availability is greater than the predetermined bandwidth availability threshold, after the step S404, the step S408 is executed. In the step S406, the load management module 331 of the wireless AP device determines whether the CPU utilization rate is greater than the predetermined CPU utilization rate threshold. If the CPU utilization rate is less than the predetermined CPU utilization rate threshold, after the step S406, a step S410 is executed; and if the CPU utilization rate is greater than the predetermined CPU utilization rate threshold, after the step S406, the step S408 is executed.

In the step S408, the load management module 331 of the wireless AP device activates a load balancing mechanism. In the step S410, the load management module 331 of the wireless AP device does not activate the load balancing mechanism. After the step S408, a step S412 is executed. In the step S412, when a connection request message of an unconnected wireless terminal device is received, the load management module 331 of the wireless AP device notifies the wireless communication protocol processing module 332 not to reply the connection request message, so that the unconnected wireless terminal device continually attempts to establish connection with other wireless AP devices, and by now the method 400 is terminated. After the step S410, a step S414 is executed. In the step S414, when a connection request message of an unconnected wireless terminal device is received, the load management module 331 of the wireless AP device notifies the wireless communication protocol processing module 332 to reply or accept the connection request message.

In other exemplary embodiment, in a step similar to the step S412, when a wireless AP device receives a connection request message of an unconnected wireless terminal device, and the wireless AP device has already activated the load balancing mechanism, the load management module 331 of the wireless AP device may further notify the wireless communication protocol processing module 332 to reply a disassociation message in response to the connection request message, so that the unconnected wireless terminal device continues to attempt establishing a connection with other wireless AP devices, so as to achieve the load balance of the wireless network system.

Figure 5:
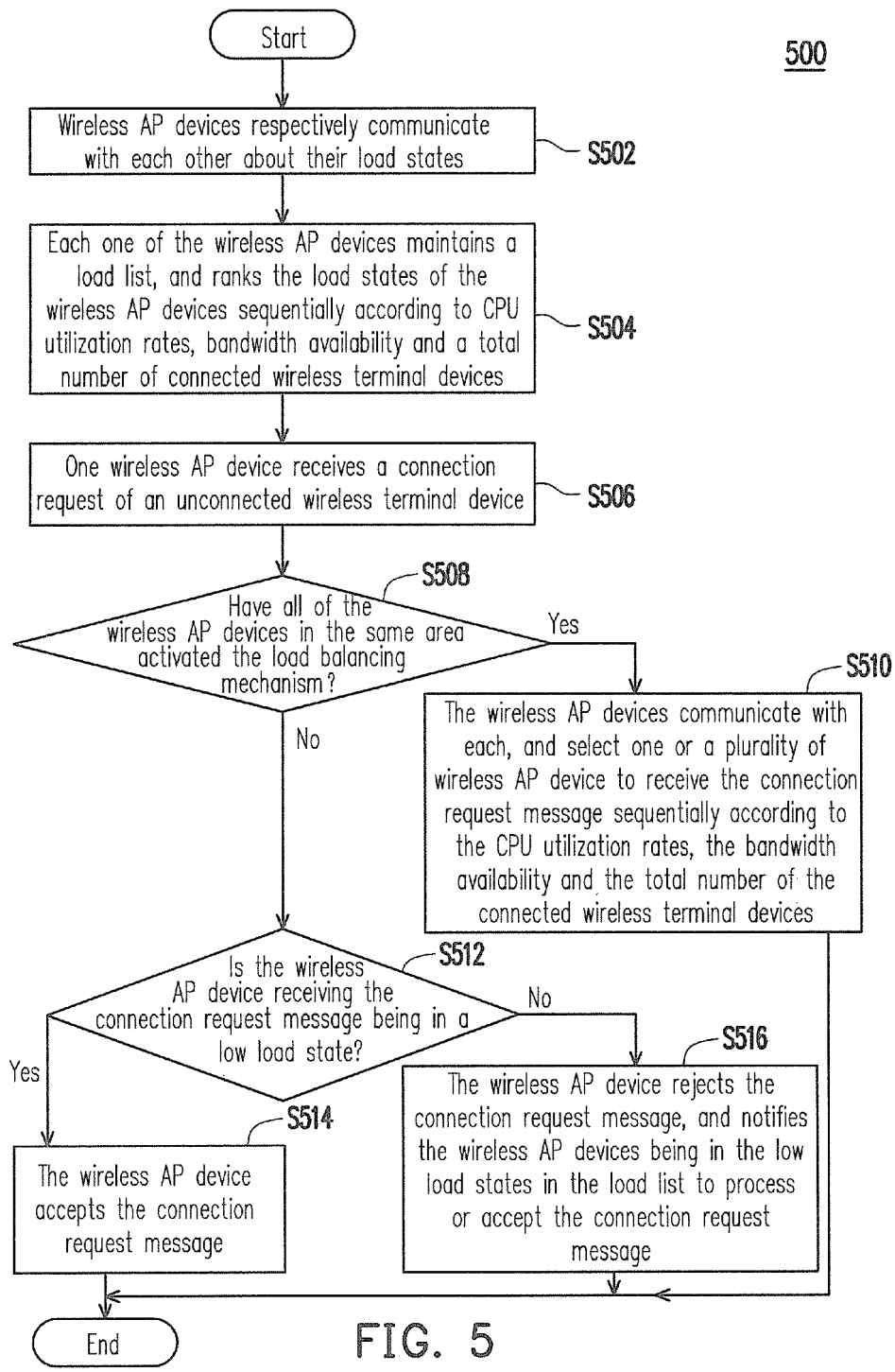
FIG. 5 is a flowchart illustrating a collaborative load balancing method for multiple wireless AP devices according to an exemplary embodiment of the invention.

FIG. 5 is a flowchart illustrating a collaborative load balancing method 500 for multiple wireless AP devices according to an exemplary embodiment of the invention. A difference between the collaborative load balancing method 500 for multiple wireless AP devices and the load balancing method 400 of the wireless AP device is that when all of the wireless AP devices in the same area activate the load balancing mechanism, the wireless AP devices can collaboratively determine whether or not to further accept a connection request message of an unconnected wireless terminal device. If it is determined to accept the connection request message of the newly added wireless terminal device, the wireless AP devices further collaboratively determine a specific wireless AP device to process or accept the connection request message.

Referring to FIG. 2, FIG. 3A and FIG. 5, in the collaborative load balancing method 500 for multiple wireless AP devices, the wireless AP devices (for example, the wireless AP devices 1101-1104, . . . , 110m) communicate with each other about their respective load states (step S502). Each one of the wireless AP devices maintains a load list, and ranks the load states of the wireless AP devices according to CPU utilization rates, bandwidth availabilities and the total numbers of the connected wireless terminal devices (step S504). One of the multiple wireless AP devices (for example, the wireless AP device 1101) receives a connection request message of an unconnected wireless terminal device (for example, the wireless terminal device 120n) (step S506). The load management module of the wireless AP device (i.e. the wireless AP device 1101) determines whether all of the wireless AP devices in the same area have activated the load balancing mechanism (step S508). If all of the wireless AP devices in the same area have activated the load balancing mechanism, after the step S508, a step S510 is executed; and if not all of the wireless AP devices in the same area have activated the load balancing mechanism, after the step S508, a step S512 is executed.

In the step S512, the load management module 331 of the wireless AP device (i.e. the wireless AP device 1101) that receives the connection request message determines whether the wireless AP device 1101 is in the low load state. If the wireless AP device 1101 is in the low load state, after the step S512, a step S514 is executed, by which the wireless AP device accepts the connection request message. If the wireless AP device 1101 is not in the low load state, after the step S512, a step S516 is executed, by which the load management module 331 of the wireless AP device notifies the wireless communication protocol processing module 332 to reject (or not to reply) the connection request message, and notifies the wireless AP devices (for example, the wireless AP device 1103) being in the low load states in the load list to process the connection request message.

In the collaborative load balancing method 500 for multiple wireless AP devices, if all of the wireless AP devices in the same area have activated the load balancing mechanism, then the wireless AP devices respectively communicate with each other, and collaboratively select one or a plurality of wireless AP devices to accept the connection request message according to the CPU utilization rates, the bandwidth availability and the total numbers of the connected wireless terminal devices (step S510).

To be more specific, each one of the wireless AP devices first selects a wireless AP device being in the lowest CPU utilization rate from its own load list; and if there are more than one wireless AP devices having the lowest CPU utilization rate, each one of the wireless AP devices further selects a wireless AP device having the lowest bandwidth availability from its own load list; and if there are more than one wireless AP devices having the lowest bandwidth availability, each one of the wireless AP devices further selects a wireless AP device having the lowest total number of the connected wireless terminal devices from its own load list. After the steps S510 and S516, the collaborative load balancing method 500 of multiple wireless AP devices is terminated.

In summary, exemplary embodiments of the invention provide a wireless network system and a wireless AP device thereof. The wireless network system has a load balancing mechanism, which can averagely distribute the connections of the wireless terminal devices to the wireless AP devices in the same area, so as to optimize the connections of the wireless network. The wireless AP device maintains a load list of the load states of all of the wireless AP devices in the same area, and according to its own load state, the wireless AP device selects to accept a connection request message of a wireless terminal device, or notifies one or a plurality of wireless AP devices having the low load states in the same area to accept such connection request message, so as to achieve the load balance of the wireless network system.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A wireless network system, comprising:
    a plurality of wireless access point (AP) devices, wherein each one of the plurality of wireless AP devices is configured for maintaining a load list of load states of all wireless AP devices in a same area, and ranking the load states of all wireless AP devices in the load list according to at least current central processing unit (CPU) utilization rates of the wireless AP devices; and
    a plurality of wireless terminal devices,
    wherein when a wireless terminal device sends a connection request message to one of the wireless AP devices, said wireless AP device determines whether itself is in a low load state, and accordingly selects to accept the connection request message or notifies one or a plurality of wireless AP devices being in the low load states in the same area to accept the connection request message.

2. The wireless network system as claimed in claim 1, wherein each one of the wireless AP devices ranks the load state of each one of the wireless AP devices to be a high load state, a medium load state and a low load state in the load list according to a CPU utilization rate, a bandwidth availability and a total number of connected wireless terminal devices of each one of the wireless AP devices.

3. The wireless network system as claimed in claim 2, further characterized in that:
    the low load state is that the total number of the connected wireless terminal devices of the wireless AP device is less than or equal to a predetermined connection number threshold, the CPU utilization rate is less than or equal to a first CPU utilization rate threshold, and the bandwidth availability is less than or equal to a first bandwidth availability threshold;
    the medium load state is that the total number of the connected wireless terminal devices of the wireless AP device is less than or equal to the predetermined connection number threshold, the CPU utilization rate is less than or equal to a second CPU utilization rate threshold, and the bandwidth availability is less than or equal to a second bandwidth availability threshold; and
    the high load state is that the total number of the connected wireless terminal devices of the wireless AP device is greater than the predetermined connection number threshold, or the CPU utilization rate is greater than the second CPU utilization rate threshold, or the bandwidth availability is greater than the second bandwidth availability threshold.

4. The wireless network system as claimed in claim 2, further characterized in that:
    if a wireless AP device determines its total number of the connected wireless terminal devices being greater than a predetermined connection number threshold, the wireless AP device activates a load balancing mechanism;

if the wireless AP device determines its CPU utilization rate being greater than a first CPU utilization rate threshold, the wireless AP device activates the load balancing mechanism; and if the wireless AP device determines its bandwidth availability being greater than a first bandwidth availability threshold, the wireless AP device activates the load balancing mechanism.

5. The wireless network system as claimed in claim 4, wherein when all of the wireless AP devices have activated the load balancing mechanism, the wireless AP devices use an inter access point protocol (IAPP) to respectively communicate with each other their own load states, and collaboratively determine whether or not to accept a connection request message of an unconnected wireless terminal device.

6. The wireless network system as claimed in claim 5, wherein when all of the wireless AP devices have activated the load balancing mechanism, and have determined to accept the connection request message of the unconnected wireless terminal device, the wireless AP devices further determine a wireless AP device to accept the connection request message according to the CPU utilization rate, the bandwidth availability and the total number of the connected wireless terminal devices of each one of the wireless AP devices.

7. The wireless network system as claimed in claim 1, further characterized in that:

when the load state of any one of the wireless AP devices is changed, an update notification is broadcasted from said any one of the wireless AP devices to the other wireless AP devices in the same area, so that the other wireless AP devices respectively update their own load lists; and the wireless AP devices use an inter access point protocol (IAPP) to respectively communicate with each other about their own load states, wherein the load state comprises a CPU utilization rate, a bandwidth availability and a total number of the connected wireless terminal devices.

8. The wireless network system as claimed in claim 1, further characterized in that:

when said one of the wireless AP devices receives said connection request message from said wireless terminal device, and said wireless AP device determines itself being in the low load state, the wireless AP device automatically accepts the connection request message; and when said one of the wireless AP devices receives the connection request message from the wireless terminal device, and the wireless AP device determines itself not being in the low load state, the wireless AP device rejects the connection request message, and notifies said one or a plurality of the wireless AP devices being in the low load states to accept the connection request message.

9. The wireless network system as claimed in claim 8, further characterized in that:

the connection request message comprises a probe request message, an authentication message, or an association request message; and the wireless AP device uses a disassociation message to reject the connection request message.

10. A wireless access point (AP) device, adapted for providing a wireless network connection service to at least one wireless terminal device and executing a load balancing mechanism, the wireless AP device comprising:

a wireless transceiver module, configured for wirelessly connecting at least one wireless AP device in a same area or at least one wireless terminal device;

a memory module, comprising:

a wireless communication protocol processing module, configured for processing a connection request message sent by the at least one wireless terminal device; and a load management module, configured for maintaining a load list of load states of all wireless AP devices in the same area, and ranking the load states of all wireless AP devices in the load list according to at least central processing unit (CPU) utilization rates of the wireless AP devices; and a processor module, configured for executing the wireless communication protocol processing module and the load management module, and controlling the wireless transceiver module and the memory module, wherein when the at least one wireless terminal device sends the connection request message to the wireless AP device, the load management module selects to accept the connection request message or notifies one or a plurality of wireless AP devices being in low load states in the same area to accept the connection request message according to the CPU utilization rate of the processor module.

11. The wireless AP device as claimed in claim 10, wherein the load management module further ranks the load state of each wireless AP device to be a high load state, a medium load state and a low load state in the load list according to a CPU utilization rate, a bandwidth availability and a total number of connected wireless terminal devices of each one of the wireless AP devices.

12. The wireless AP device as claimed in claim 11, further characterized in that:

the low load state is that the total number of the connected wireless terminal devices of the wireless AP device is less than or equal to a predetermined connection number threshold, the CPU utilization rate is less than or equal to a first CPU utilization rate threshold, and the bandwidth availability is less than or equal to a first bandwidth availability threshold;

the medium load state is that the total number of the connected wireless terminal devices of the wireless AP device is less than or equal to the predetermined connection number threshold, the CPU utilization rate is less than or equal to a second CPU utilization rate threshold, and the bandwidth availability is less than or equal to a second bandwidth availability threshold; and the high load state is that the total number of the connected wireless terminal devices of the wireless AP device is greater than the predetermined connection number threshold, or the CPU utilization rate is greater than the second CPU utilization rate threshold, or the bandwidth availability is greater than the second bandwidth availability threshold.

13. The wireless AP device as claimed in claim 10, further characterized in that:

the load management module broadcasts an update notification to other wireless AP devices in the same area when the load state of the wireless AP devices is changed, so that the other wireless AP devices respectively update their own load lists; and the load management module uses an inter access point protocol (IAPP) to communicate with the other wireless AP devices in the same area about the load state of the wireless AP device, wherein the load state comprises a CPU utilization rate, a bandwidth availability and a total number of the connected wireless terminal devices.

14. The wireless AP device as claimed in claim 10, further characterized in that:
  when the wireless AP device receives said connection request message from said wireless terminal device, and the load management module determines the wireless AP device itself being in the low load state, the load management module notifies the wireless communication protocol processing module to accept the connection request message; and
  when the wireless AP device receives the connection request message from the wireless terminal device, and the wireless AP device determines itself being not in the low load state, the load management module notifies the wireless communication protocol processing module to reject the connection request message, and notifies said one or a plurality of the wireless AP devices being in the low load states in the same area to accept the connection request message.

15. The wireless AP device as claimed in claim 10, further characterized in that:
  the connection request message comprises a probe request message, an authentication message, or an association request message; and
  the wireless communication protocol processing module uses a disassociation message to reject the connection request message.

16. A wireless access point (AP) device, adapted for providing a wireless network connection service for at least one wireless terminal device and executing a load balancing mechanism, the wireless AP device comprising:
  a wireless transceiver module, configured for wirelessly connecting at least one wireless AP device in a same area or at least one wireless terminal device;
  a memory module, comprising:
    a wireless communication protocol processing module, configured for processing a connection request message sent by at least one wireless terminal device; and
    a load management module, configured for maintaining a load list of load states of all wireless AP devices in the same area, and broadcasting an update notification to the other wireless AP devices in the same area when the load state of the wireless AP device is changed, so that the other wireless AP devices respectively update their own load lists; and
  a processor module, configured for executing the wireless communication protocol processing module and the load management module, and controlling the wireless transceiver module and the memory module,
  wherein when a wireless terminal device sends the connection request message to the wireless AP device, the load management module determines whether the wireless AP device is in a low load state, and selects to accept the connection request message or notify one or a plurality of wireless AP devices having low load states to accept the connection request message according to whether the wireless AP device is in a low load state.

17. The wireless AP device as claimed in claim 16, further characterized in that:
  the load management module further ranks the load state of each one of the wireless AP devices to be a high load state, a medium load state and a low load state in the load list according to a CPU utilization rate, a bandwidth availability and a total number of connected wireless terminal devices of each one of the wireless AP devices;
  the low load state is that the total number of the connected wireless terminal devices of the wireless AP device is less than or equal to a predetermined connection number threshold, the CPU utilization rate is less than or equal to a first CPU utilization rate threshold, and the bandwidth availability is smaller than or equal to a first bandwidth availability threshold;
  the medium load state is that the total number of the connected wireless terminal devices of the wireless AP device is less than or equal to the predetermined connection number threshold, the CPU utilization rate is less than or equal to a second CPU utilization rate threshold, and the bandwidth availability is less than or equal to a second bandwidth availability threshold; and
  the high load state is that the total number of the connected wireless terminal devices of the wireless AP device is greater than the predetermined connection number threshold, or the CPU utilization rate is greater than the second CPU utilization rate threshold, or the bandwidth availability is greater than the second bandwidth availability threshold.

18. The wireless AP device as claimed in claim 16, further characterized in that:
  if the load management module determines a total number of the connected wireless terminal devices of the wireless AP device is greater than a predetermined connection number threshold, the load management module activates a load balancing mechanism;
  if the load management module determines a CPU utilization rate of the wireless AP device is greater than a first CPU utilization rate threshold, the load management module activates the load balancing mechanism; and
  if the load management module determines a bandwidth availability of the wireless AP device is greater than a first bandwidth availability threshold, the load management module activates the load balancing mechanism.

19. The wireless AP device as claimed in claim 18, wherein when all of the wireless AP devices have activated the load balancing mechanism, the load management module of each one of the wireless AP devices use an inter access point protocol (IAPP) to respectively communicate with the other wireless AP devices in the same area about the load state of each one of the wireless AP devices, and determine whether or not to accept a connection request message of an unconnected wireless terminal device.

20. The wireless AP device as claimed in claim 19, wherein when all of the wireless AP devices have activated the load balancing mechanism, and have determined to accept the connection request message of the unconnected wireless terminal device, the wireless AP devices further determine a wireless AP device to accept the connection request message according to the CPU utilization rate, the bandwidth availability and the total number of the connected wireless terminal devices of each one of the wireless AP devices.

* * * * *